US012640926B2

(12) United States Patent
Houston et al.

(10) Patent No.: US 12,640,926 B2
(45) Date of Patent: May 26, 2026

(54) EMBEDDED RESOURCE MANAGEMENT PLATFORM

(71) Applicant: ADP, Inc., Roseland, NJ (US)

(72) Inventors: Philip Houston, Florham Park, NJ (US); Maria Lucia Recena Menezes, Florham Park, NJ (US)

(73) Assignee: ADP, Inc., Roseland, NJ (US)

( * ) Notice: Subject to any disclaimer, the term of this patent is extended or adjusted under 35 U.S.C. 154(b) by 51 days.

(21) Appl. No.: 18/909,635

(22) Filed: Oct. 8, 2024

(65) Prior Publication Data

US 2025/0119290 A1     Apr. 10, 2025

Related U.S. Application Data

(60) Provisional application No. 63/543,218, filed on Oct. 9, 2023.

(51) Int. Cl.
*H04L 9/32* (2006.01)
*H04L 9/08* (2006.01)
*H04L 9/40* (2022.01)

(52) U.S. Cl.
CPC ............ *H04L 9/3213* (2013.01); *H04L 9/083* (2013.01); *H04L 63/20* (2013.01)

(58) Field of Classification Search
CPC ........ H04L 9/3213; H04L 9/083; H04L 63/20
USPC ........................................................ 726/9
See application file for complete search history.

(56) References Cited

U.S. PATENT DOCUMENTS

| | | | | |
|---|---|---|---|---|
| 10,027,649 | B2 * | 7/2018 | Beecham | H04L 67/56 |
| 10,437,899 | B2 * | 10/2019 | Dintenfass | G06F 16/245 |
| 2011/0321162 | A1 * | 12/2011 | Gluck | H04L 63/101 |
| | | | | 726/22 |
| 2013/0191880 | A1 * | 7/2013 | Conlan | H04L 67/34 |
| | | | | 726/1 |
| 2017/0346830 | A1 * | 11/2017 | Goldfarb | G06F 21/305 |
| 2017/0366547 | A1 * | 12/2017 | Goldfarb | H04L 63/10 |
| 2018/0302390 | A1 * | 10/2018 | Beecham | H04L 63/083 |
| 2018/0322257 | A1 * | 11/2018 | Dintenfass | G06Q 10/0631 |

(Continued)

OTHER PUBLICATIONS

AtlasCamp 2014, Developers united in Berlin—AtlasCamp 2014.*
Android Enterprise Migration Bluebook, 2019.*

*Primary Examiner* — Samson B Lemma
(74) *Attorney, Agent, or Firm* — Foley & Lardner LLP

(57) ABSTRACT

Providing an embedded resource management platform within a user interface frame is provided. A processor can create a user interface frame based on a resource management application provided by a resource management server, determine features of a third-party application and configure the user interface frame of the resource management application according to the features. The processor can provide the configured user interface frame for display within the third-party application and establish a secure communication channel for data exchange between the configured user interface frame and the resource management server in accordance with a security policy of the resource management server. The processor can create, for embedding with the third-party application, an application programming interface for the third-party application that is configured to call into a function of the resource management application via the secure communication channel.

18 Claims, 11 Drawing Sheets

(56)          References Cited

U.S. PATENT DOCUMENTS

2018/0322475 A1*  11/2018  Dintenfass ............. G06Q 20/10
2018/0324186 A1*  11/2018  Dintenfass ............. G06F 21/31

* cited by examiner

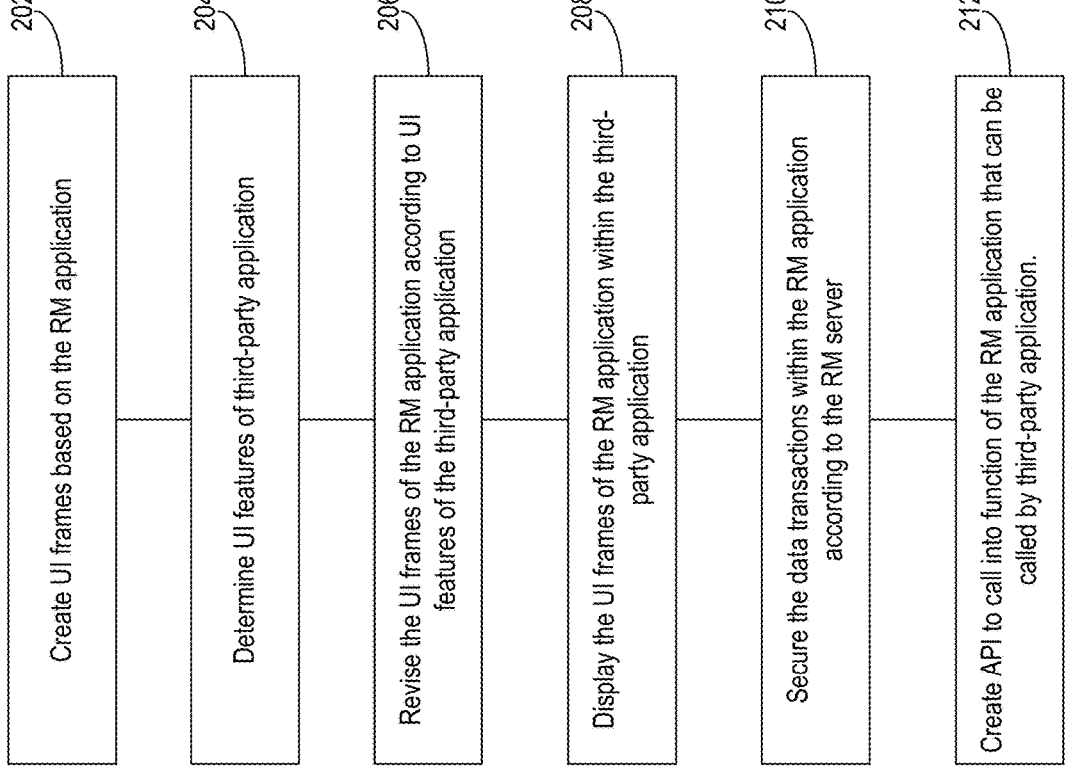

202 — Create UI frames based on the RM application

204 — Determine UI features of third-party application

206 — Revise the UI frames of the RM application according to UI features of the third-party application 208 — Display the UI frames of the RM application within the third-party application 210 — Secure the data transactions within the RM application according to the RM server 212 — Create API to call into function of the RM application that can be called by third-party application.

Create UI frame based on the RM application    1105

Configure UI frame according to third-party features    1110

Display UI frame within third-party application    1115

Establish secure communication between UI frame and the RM server    1120

Create API for third-party application into a function of the RM application    1125

EMBEDDED RESOURCE MANAGEMENT PLATFORM

CROSS-REFERENCES TO RELATED APPLICATIONS

This application claims the benefit of priority under 35 U.S.C. § 119 to U.S. Provisional Patent Application No. 63/543,218, filed Oct. 9, 2023, which is hereby incorporated by reference herein in its entirety.

TECHNICAL FIELD

This disclosure is directed to an embedded resource management platform.

BACKGROUND

Applications can provide a variety of services to client devices. These applications can include different functionalities. However, due to the increasing variety or complexity of functionalities provided by such applications, and the types of client devices, it can be challenging to provide services in an efficient and reliable manner to the client devices.

SUMMARY

Aspects of technical solutions of this application are directed to an embedded resource management platform. It can be challenging for an entity to provide certain services or functionality via an application in an efficient and reliable manner. Thus, systems and methods of this disclosure can provide an embedded resource management platform that integrate certain functions or services in an application provided by a different, third-party entity.

An aspect of this disclosure can be directed to a system. The system can include one or more processors coupled with memory. The system can create a user interface frame based on a resource management application provided by a resource management server. The system can determine one or more features of a third-party application. The system can configure the user interface frame of the resource management application according to the one or more features of the third-party application. The system can provide the configured user interface frame for display within the third-party application. The system can establish a secure communication channel for data exchange between the configured user interface frame in accordance with a security policy of the resource management server. The system can create, for embedding with the third-party application, an application programming interface for the third-party application that is configured to call into a function of the resource management application via the secure communication channel.

An aspect of this disclosure can be directed to a method. The method can be performed by one or more processors, coupled with memory. The method can include the one or more processors creating a user interface frame based on a resource management application provided by a resource management server. The method can include the one or more processors determining one or more features of a third-party application. The method can include the one or more processors configuring the user interface frame of the resource management application according to the one or more features of the third-party application. The method can include the one or more processors providing the configured user interface frame for display within the third-party application. The method can include the one or more processors establishing a secure communication channel for data exchange between the configured user interface frame in accordance with a security policy of the resource management server. The method can include the one or more processors creating, for embedding with the third-party application, an application programming interface for the third-party application that is configured to call into a function of the resource management application via the secure communication channel.

An aspect of this disclosure can be directed a non-transitory computer-readable medium that stores processor-executable instructions that, when executed by one or more processors, cause the one or more processors to create a user interface frame based on a resource management application provided by a resource management server. The instructions can cause the one or more processors to determine one or more features of a third-party application. The instructions can cause the one or more processors to configure the user interface frame of the resource management application according to the one or more features of the third-party application. The instructions can cause the one or more processors to provide the configured user interface frame for display within the third-party application. The instructions can cause the one or more processors to establish a secure communication channel for data exchange between the configured user interface frame in accordance with a security policy of the resource management server. The instructions can cause the one or more processors to create, for embedding with the third-party application, an application programming interface for the third-party application that is configured to call into a function of the resource management application via the secure communication channel.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 2 is an illustrative example of a method of an embedded resource management platform.

DETAILED DESCRIPTION OF ASPECTS OF THE INVENTION

Aspects of technical solutions of this application are directed to an embedded resource management platform. It can be challenging for an entity to provide certain services or functionality via an application in an efficient and reliable manner. Thus, systems and methods of this disclosure can provide an embedded resource management platform that integrate certain functions or services in an application provided by a different, third-party entity.

A resource management platform can provide one or more service or functionality related to a human capital management, such as payroll processing. This technology can embed functionality provided by a resource management application or platform hosted by a server that is remote from a third-party entity.

For example, the embedded resource management platform of this technology can provide embedded payroll functionality. By using embedded payroll functionality, this technology can provide a more reliably, secure, and up-to-date payroll functionality or service directly within a third-party application. The embedded payroll functionality can facilitate scaling a third-party application's distribution. The embedded payroll functionality can also facilitate providing an improved user experience or user interface journey within a third-party application or platform. The embedded payroll functionality can provide secure application programming interfaces to create a seamless, automated workflow, while maintaining data security. The embedded resource management platform can facilitate an end-to-end digital onboarding experience.

Thus, this technology can provide the functionality of services of the resource management server in a third-party application or platform, including processing payroll, tax calculations, filing and payment, paying using direct deposit, viewing monthly or quarterly payroll reports online, accessing monthly or quarterly payroll reports online, customizing monthly or quarterly payroll reports online, printing monthly or quarterly payroll reports online, offering a web portal that allows for viewing pay history and tax forms, offering debit cards that can provide cashback rewards, all while maintaining network and data security.

Figure 1:
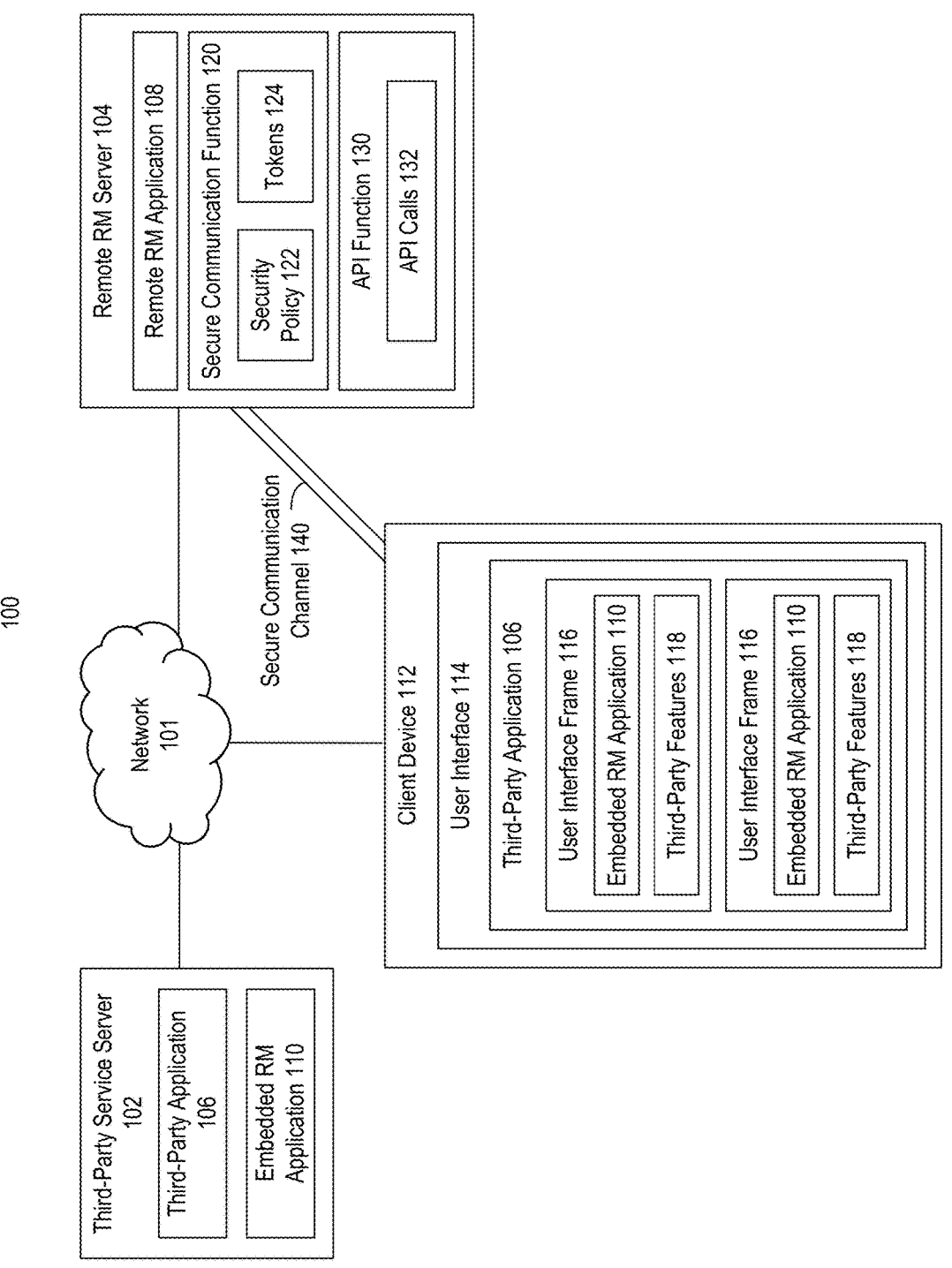
FIG. 1 is an illustrative example of a system of an embedded resource management platform.

FIG. 1 is an illustrative example system 100 of an embedded resource management platform. The system 100 can include, access, or otherwise interface with a third-party service server 102 that can include a third-party application 106 and an embedded RM application 110. The system 100 can include, access, or otherwise interface with a remote server 104, also referred to as a remote resource management (RM) server 104. The remote RM server 104 can include one or more of remote RM applications 108, secure communication functions 120 that can establish, manage and utilize one or more security policies 122 and tokens 124, and one or more API functions 130 for generating and managing one or more API calls 132. The system 100 can include, access, or otherwise interface with a client device 112, which can include any device of an enterprise or an organization seeking to use the features or functionalities of the third-party application 106 and the remote RM application 108. The client device 112 can communicate with the third-party service server 102 and the remote server 104 via the network 101. The client device 112 can include a user interface 114 for executing a third-party application 106 that can include one or more user interface frames 116 configured to include or execute one or more embedded RM applications 110 with one or more third-party features 118. The user interface frame 116 of the client device 112 can exchange secured data with the remote RM server 104 via a secure communication channel 140 established by the secure communication function 120 and the security policy 122 and tokens 124 of the remote RM server 104. The remote RM server 104 and the contents of the user interface frame 116 (e.g., embedded RM application 110) can communicate or manage the operation of the embedded RM application 110 via the secure communication channel 140.

The third-party service server 102 or the remote server 104 can include one or more processors (e.g., 1010), coupled with memory (e.g., 1015). The memory 1015 can include or store commands, instructions or data that can be configured to cause the one or more processors 1010 to implement various functionalities of the system 100, such as any functionalities or the operations of the client device 112, the remote RM server 104 or the third-party service server 102. The one or more processors 1010 performing the functionalities of the system 100 can be deployed on any one or any combination of the devices, including the third-party service server 102, the remote RM server 104 or the client device 112.

Figure 10:
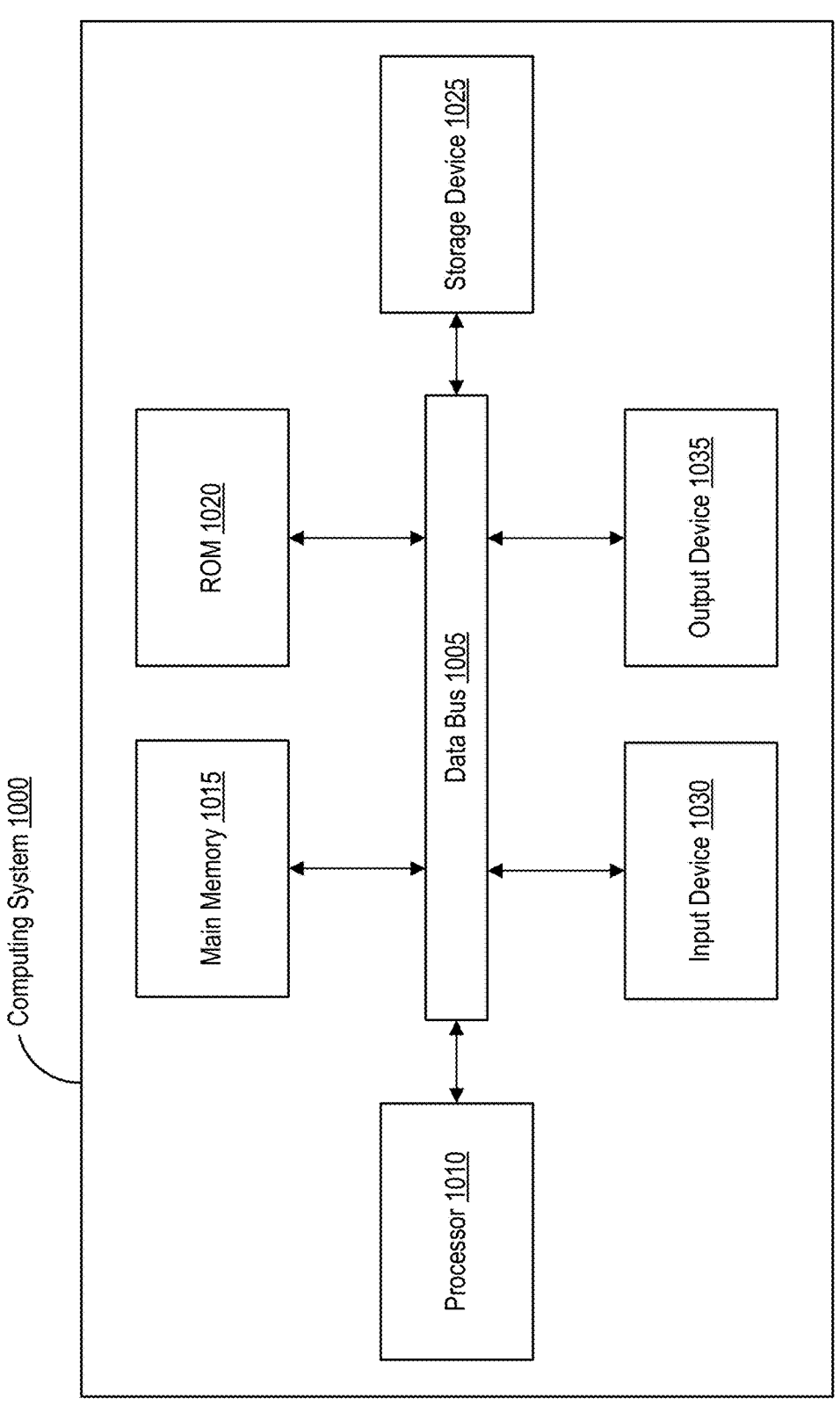
FIG. 10 illustrates a block diagram of an example computing system for implementing the embodiments of the present solution, including, for example, the systems depicted in FIGS. 1, 7, 8, and 9, the methods depicted in FIGS. 2 and 6, and the graphical user interfaces depicted in FIGS. 3, 4, and 5.

One or more component depicted in FIG. 1 can include one or more system, component, or functionality depicted in FIG. 10. The third-party service server 102 can communicate with the remote server 104 via a network 101. Network 101 can include one or more types of networks that can be used for communication between. Network 101 can include the Internet or one or more Local Area Networks (LANs), which can be used within a limited geographical area, such as an office or building, and Wide Area Networks (WANs), which span larger distances and can connect devices across cities or countries. Network 101 can include one or more Metropolitan Area Networks (MANs) which can be utilized to cover a city or metropolitan area. Network 101 can support internet-based connections, using protocols like TCP/IP, and enable access to cloud-based data processing systems. Network 101 can include or support wireless networks, such as Wi-Fi and cellular networks, as well as Virtual Private Networks (VPNs) which can provide security to public networks. Network 101 can include or utilize Intranets (e.g., private networks within an organization) facilitating internal communications.

The third-party service server 102 can provide a third-party application 106. The third-party service server 102 can include one or more servers, physical or virtual machines, or cloud-based services, such as software as a service (SaaS) products provided to the client devices 112. The third-party application 106 can include any application that the third-party service server 102 can provide for a client device 112 with functionalities for performing operations associated with human capital management (HCM) services, such as payroll services, resource management, payment processing, employee benefits or services, performance management or workforce planning. The third-party application 106 can include, for example, a point-of-sale application, restaurant management application, plant management application, banking application, project management platform, e-commerce platform, resource or financial accounting system, insurance management system, healthcare management system, retail management software, educational institution platform, transportation logistics system, legal case management software, or hospitality management application. The third-party application 106 can include, integrate with, or otherwise access an embedded resource management "RM" application 110, which can include or implement (e.g., via API calls 132) functionalities of the remote RM application 108 that can execute on the remote RM server 104. The embedded RM application 110 can refer to or include a human capital management (HCM) application. The embedded RM application 110 can include, for example, a payroll or taxation processing system, an employee compensation or benefits management platform, a time and attendance tracking application, a recruitment and applicant tracking system, an employee onboarding system, a performance management and evaluation system, a learning and development management system, a compensation and salary planning application or a workforce analytics and reporting system.

A client device 112 can include any device or a system of a client utilizing the functionalities of the system 100, including any functions of the third-party service server 102 or remote RM server 104. The client device 112 can be a computing device (e.g., a computer, a laptop, a tablet or a smartphone) associated with a client account or a profile configured to access and utilize the third-party application 106. The third-party application 106 can be configured with the embedded RM application 110 to be displayed on a display (e.g., 1035) of the client device 112 using a user interface 114, such as a graphical user interface in which the third-party application 106, along with its UI frame 116 and the embedded RM application 110 functionalities can be presented, executed and displayed. The user interface 114 can include a web browser interface for displaying or presenting a web-based version of the third-party application 106 with UI frames 116 configured using iFrames to present the web-version of the embedded RM application 110 within the UI frames 116 of the third-party application 106.

The remote server 104, also referred to as the remote resource management (RM) server 104, can refer to or include a human capital management (HCM) server. The HCM functionalities of the RM server 104 can be configured for providing processes for acquiring, managing or optimizing an organization's workforce, such as operations associated with employee recruiting, training, payroll services or employee development. The remote server 104 can include or provide a remote RM application 108. The remote RM application 108 can include or provide one or more service or functionality of the embedded RM application 110, including, for example, pay processing, tax processing, employee compensation and benefits managements, human resource processing, or recruitment.

This technology can embed one or more aspects or functionality of the remote RM application 108 into or with the third-party application 106 to establish, generate, create, or otherwise provide the embedded RM application 110. The embedded RM application 110 can include application features or functionalities that can be integrated within the third-party application 106 and configured to display as a part of the third-party application 106. To do so, the system 100 can create user interface ("UI") frames 116 that can use or be based on the remote RM application 108. The system can determine themes or other UI features of the third-party application 106.

The user interface frame 116 can be or include a visual container or a structure that allows embedding of at least a feature (e.g., a functionality or an operation) of the embedded RM application 110 within a third-party application 106. UI frame 116 can adapt the elements of the remote RM application 108 to match the third-party features 118 (e.g., match the look and feel of the third-party application 106) allowing for a seamless user experience. The UI frame 116 can facilitate a secure interaction between the third-party application 106 and remote RM application 108 by providing the embedded RM application 110 with the third-party features 118 within the user interface frame 116 inserted, embedded or incorporated within the graphical user interface depicting or displaying the third-party application 106. In doing so, the UI interface 116 allows the embedded RM application 110 to provide the functionalities and operations of the remote RM application 108 (e.g., payroll, HR services) within the host platform (e.g., the third-party application 106) without use of redesign of the third-party application 106 and its operations.

The third-party features 118 can include any design elements and functionalities of the third-party application 106 that define or provide its look and feel, such as branding, color schemes, layouts, and navigation styles. Third-party features 118 can include logos with unique symbols, shapes, colors, features, company slogans or statements, fonts, button styles, navigation menus, layout structures, icons, or interaction operations (e.g., hover effects, mouse layover displays or reactions or animations). Third-party features 118 can allow the embedded RM application 110 to integrate with the third-party application 106 visually and functionally (e.g., within the UI frame 116) without disrupting the overall user experience. By aligning with the design aesthetics of the third-party application 106, the embedded RM application 110 can maintain its consistency in user interactions and the look and feel with the remainder of the third-party application 106 surrounding the UI frame 116.

The system 100 can revise the UI frames 116 of the embedded RM application 110 according to the themes or UI features of the third-party application 106. For instance, the client device 112 can include user interface 114 that can be used to display the third-party application 106 along with the user interface frames 116 including one or more of the embedder RM applications 110 with the third-party features 118. For example, the system 100 can display (e.g., via the user interface 114 of the client device 112) the revised or configured UI frames 116 of the embedded RM application 110 within the third-party application 106. In doing so, the user interface 114 can display the third-party application 106 with the UI interface 116, thereby providing the embedded RM application 110 and its functionalities, to the user of the client device 112 seamlessly, presenting it as a third-party application 106.

The RM server 104 can utilize the secure communication function 120 with the security policies 122 and the tokens 124 to provide secure communications between the embedded RM application 110 of the UI frame 116 and the remote RM server 104. For instance, the system 100 can establish a secure communication channel 140 that can secure the data transactions within the embedded RM application 110 or third-party application 106. The secure communication channel 140 can be configured or established in accordance with a security policy 122 or profile established by the remote server 104 of remote RM application 108. The secure communication channel 140 can be established between the remote RM server 104 and the client device 112, between the client device 112 and the third-party service server 102 and between the third-party service server 102 and the remote RM server 104 for any secured communications of the system 100.

The secure communication function 120 can include any combination of hardware and software to protect from unauthorized access or tampering the data transmitted between applications or systems. The secure communication function 120 can use encryption techniques, such as SSL/TLS protocols, to secure data in transit such that the sensitive information remains confidential and integral. For example, the secure communication function 120 can encrypt payroll data sent from an embedded RM application to a third-party application, safeguarding it from interception or alteration during transmission. The secure communication function 120 can utilize security policies 122 and tokens 124 to implement the secure communications between the embedded RM applications 110 and the remote RM server 104 (e.g., the remote RM application 108).

A security policy 122 can include or define any rules and guidelines that govern the protection of data and systems within a network or application environment. The security policy 122 can outline rules or requirements for data encryption, user authentication, access control, and compliance with regulatory standards. For instance, a security policy 122 can mandate the use of multi-factor authentication for accessing the RM application, enforce regular security audits, and specify encryption standards for protecting payroll and employee information. For example, a security policy 122 can demand use or inclusion of tokens 124 in HTTP headers for requests of API calls 132 between the third-party application 106 and the embedded RM application 110 to authenticate users and secure data exchanges. For instance, each request for API call 132 for accessing payroll or HR data can include a bearer token 124 in the authorization header, so that only verified requests are processed by the remote RM application 108. The security policy 122 can enforce token 124 validation within the headers of the transmissions to prevent unauthorized or expired tokens 124 from being used so as to maintaining secure, authenticated communication between systems.

Tokens 124 can include any secure, temporary credentials used to authenticate and authorize access to resources or services within a system. Tokens 124 can facilitate secure communication by providing a mechanism or a feature that can be used to verify the identity of users or systems without exposing sensitive credentials. For example, a token 124 can be issued to a user of the third-party application 106 to access the embedded RM application 110. For instance, the security policy 122 along with the secure communication function 120 can review and validate the tokens 124 to ensure that only authorized users (e.g., having validated tokens 124 that are associated with the client accounts or profiles) can interact with the HCM functionalities of the embedded RM application 110 and that their sessions are securely managed. The tokens 124 can be used to validate and authorize secure transmissions of the API calls 132 via the secure communication channels 140 between any two or more of: the remote RM server 104, third-party service server 102 and the client device 112.

A secure communication channel 140 can be any protected connection, such as an encrypted pathway, which can provide a safe exchange of data between systems. The secure communication channel 140 can be used to securely transmit data between the third-party application 106 and the embedded RM application 110. The secure communication channel 140 can be established between the third-party service server 102, the remote RM server 104 and one or more client devices 112. The secure communication channel 140 can use encryption protocols, such as SSL/TLS, to protect data from unauthorized access or tampering. For example, when payroll data is transferred between the embedded RM application 110 and the third-party platform, the secure communication channel 140 can encrypt this data, preventing interception by malicious actors. The secure communication channel 140 can enforce the use of tokens 124 as part of its security measures, using tokens 124 to authenticate the users (e.g., client accounts or profiles) that can initiate or receive data transmissions, such as generate or receive API calls 132. By validating tokens 124 before allowing access to sensitive information, the secure communication channel 140 can provide an additional layer of security.

The system 100 can create one or more application programming interfaces ("APIs") that can call (e.g., provide API calls 132) into functions of the remote RM application 108. The third-party application 106 or embedded RM application 110 can utilize the APIs to call (e.g., API calls 132) into functions or services of the remote RM application 108. The APIs or API calls 132 can be used with or without the UI frames 116. In some cases, the third-party application 106 or embedded RM application 110 can be configured to use the UI frames to minimize or reduce additional UI designing.

FIG. 2 is an illustrative example of a method 200 of an embedded resource management platform. The method 200 can be performed by one or more processors (e.g., 1010) that can be coupled with memory (e.g., 1015) that can store instructions, commands or data discussed in connection with system 100 of FIG. 1 to implement the functionalities of the method 200. For instance, the method 200 can be performed by one or more system or component depicted in FIG. 1, FIG. 7, FIG. 8, FIG. 9, or FIG. 10.

At ACT 202, the method 200 can include one or more processors creating a user interface frame based on a resource management application provided by a resource management server. The UI frame can include any portion of a displayed user interface (e.g., a GUI) that can be displayed on a client device display and within which an embedded RM application can be provided, displayed, executed, inserted or otherwise embedded. The UI frame can include an iFrame configured for web-based applications (e.g., third-party applications or embedded RM applications) implemented using the HMTL or other web-based scripts or languages.

At ACT 204, the method 200 can include the one or more processors determining one or more features of a third-party application. The third-party features can include, for example, a theme of the third-party application or platform, logos or slogans associated with the third-party application or its organization or corporation, fonts associated with the third-party application, user interfaces, buttons or menus configured for, or associated with, the third-party application, color schemes of the third-party application, sizes and shapes of features (e.g., tables, paragraphs or frame layouts), or any other visual features associated with the third-party application.

At ACT 206, the method 200 can include the one or more processors revising or configuring the user interface frame of the resource management application according to the one or more features of the third-party application. For example, the one or more processors can revise the UI frames of the RM application according to a theme of the third-party application or platform. For example, the one or more processors can configure the UI frame features (e.g., fonts, tables, menus, colors, visual layouts or any other visual features of the embedded RM application) to match or conform to the features of the third-party application.

At ACT 208, the method 200 can include the one or more processors providing the configured user interface frame for display within the third-party application. The one or more processors can display the UI frames of the revised or configured RM application within the third-party application or platform. For instance, a client device can display the third-party application with a UI frame containing or including an embedded RM application within a user interface of the client device. The user interface can be a graphical user interface for displaying the third-party application and the UI frame configured as a portion of the third-party application using the third-party features (e.g., colors, fonts, layout and other features).

At ACT 210, the method 200 can include the one or more processors establishing a secure communication channel for data exchange between the configured user interface frame in accordance with a security policy of the resource management server. The one or more processors can secure the data transactions with the embedded RM application in accordance with the security policies of the RM server. For instance, the remote RM server can establish secure communication channel using one or more of: encryption protocols and tokens for maintaining secured transmission of API calls according to a security policy.

At ACT 212, the method 200 can include the one or more processors creating, for embedding with the third-party application, an application programming interface for the third-party application that is configured to call into a function of the resource management application via the secure communication channel. The one or more processors can create APIs that can call into function of the RM application that can be called by the third-party application. The APIs can be used with or without the UI frames, based on a configuration.

Figure 3:
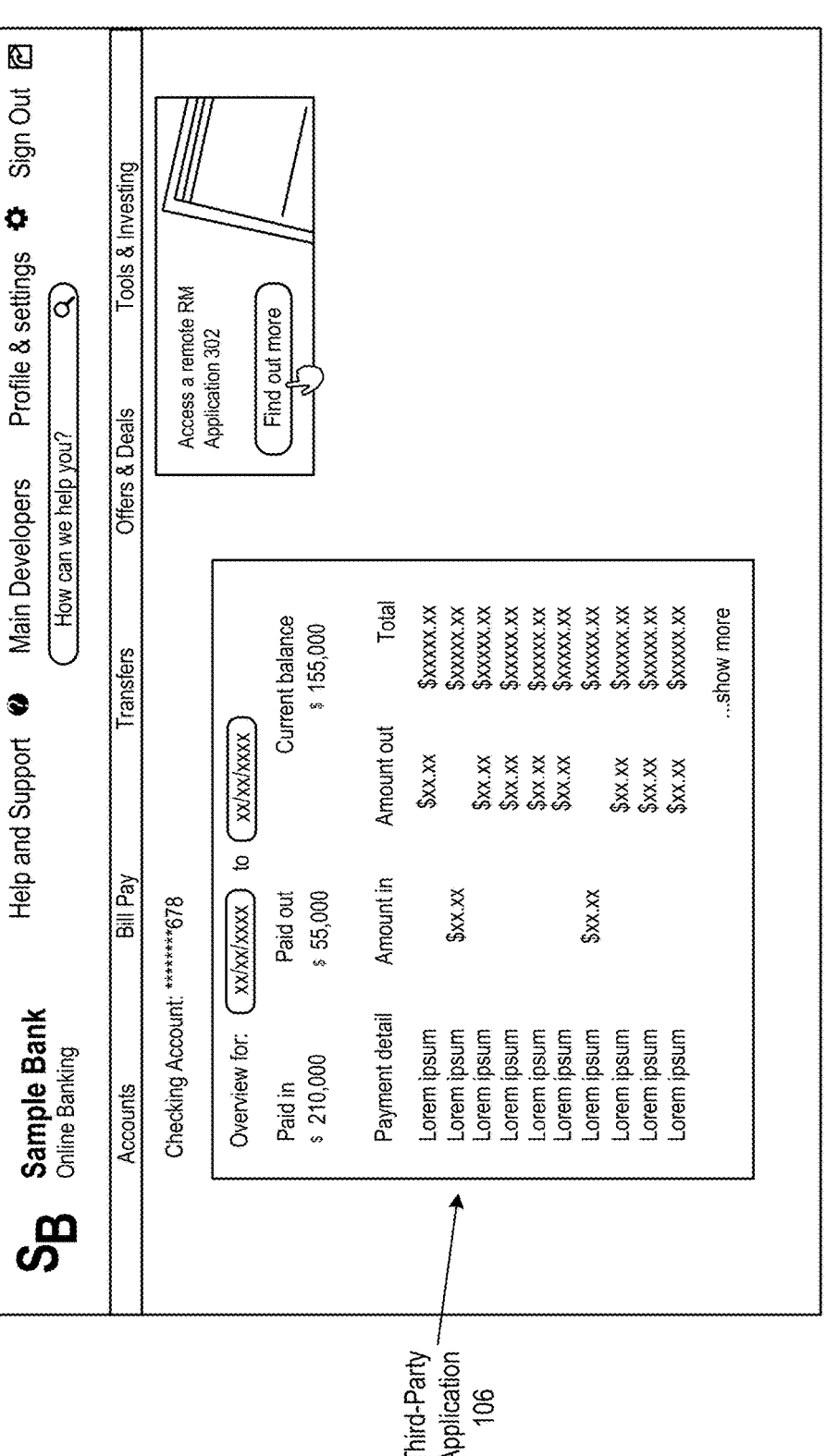
FIG. 3 is an illustrative example of a graphical user interface for a third-party application for use with an embedded resource management platform.

FIG. 3 is an illustrative example of a graphical user interface ("GUI") 300 for a third-party application 106 for use with an embedded resource management platform. The GUI 300 can be or include any user interface 114 which can be provided by one or more processors of the client device 112. The GUI 300 can be provided by one or more system or component depicted in FIG. 1, FIG. 7, FIG. 8, FIG. 9, or FIG. 10. The GUI 300 can include any type of a third-party application 106. The third-party application can be for payment processing or payroll activities and can include functions or links for an embedded RM application 110, such as a link to access a remote RM application 110. The GUI 300 can be provided by an application, such as a web browser, which executes on a computing device. For instance, the GUI 300 can provide an interactive UI element 302 to allow a user to access a remote RM application or otherwise obtain additional information about an RM application, which upon selection by a user, can be provided within a UI frame 116 within the GUI 300 (e.g., UI 114 displayed within a client device 112)

Figure 4:
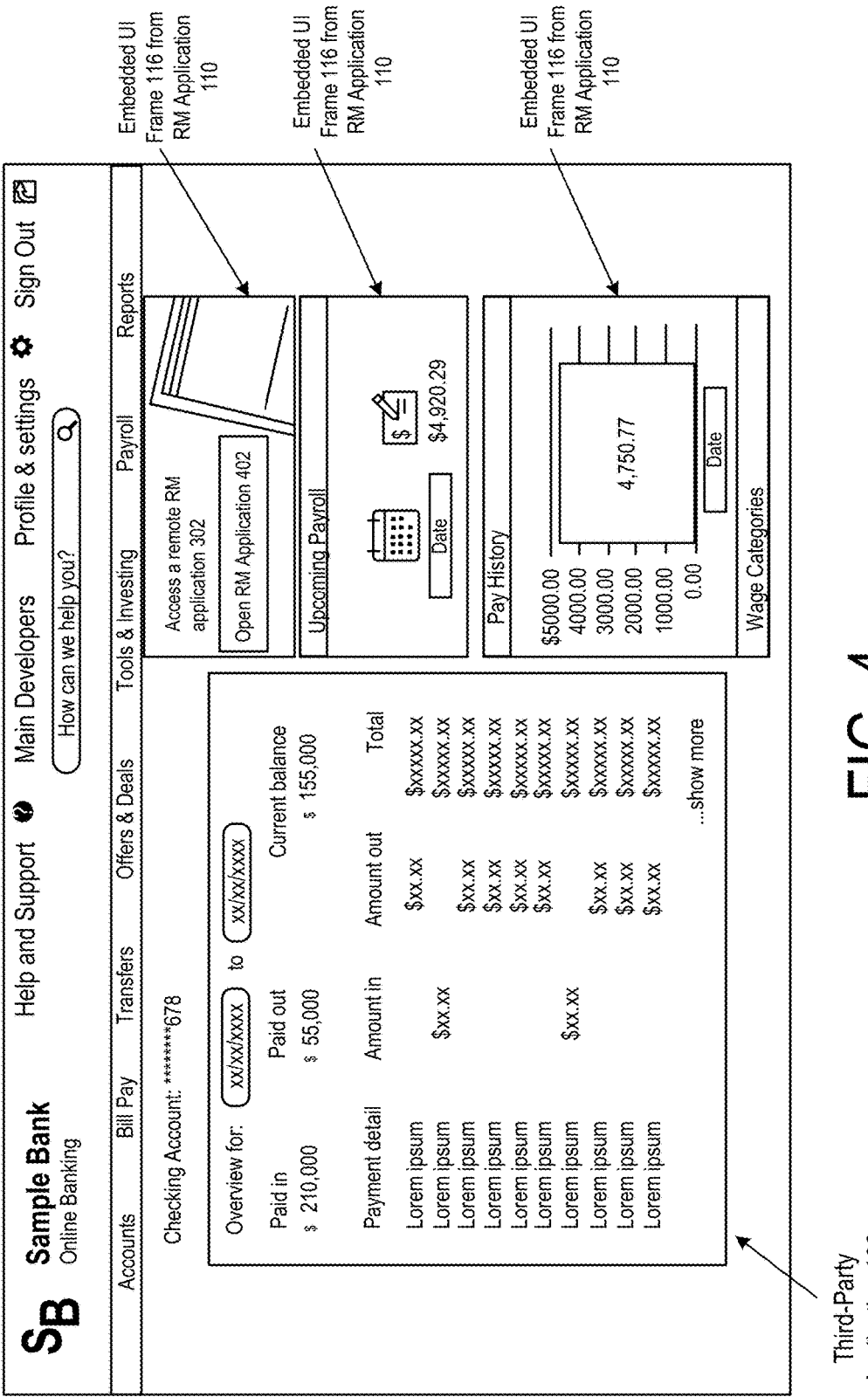
FIG. 4 is an illustrative example of a graphical user interface for a third-party application for use with an embedded resource management platform.

FIG. 4 is an illustrative example of a graphical user interface 400 for a third-party application for use with an embedded resource management platform. The GUI 400 can be or include user interface 114 that can be provided by one or more processors. The GUI 400 can be provided by one or more system or component depicted in FIG. 1, FIG. 7, FIG. 8, FIG. 9, or FIG. 10. The GUI 400 can include a GUI for the third-party application 106. The GUI 400 can include one or more embedded UI frames 116 from the RM application (e.g., embedded RM application 110). The embedded UI frames 116 can include an interactive UI element 402 (e.g., a link or a button) to provide access to the remote RM application 108, such as via particular functions or operations of the embedded RM 110. The embedded UI frame 116 can provide information about upcoming payment or payment history which can be inserted within and configured to have the look and feel (e.g., third-party features) of the third-party application 106.

Figure 5:
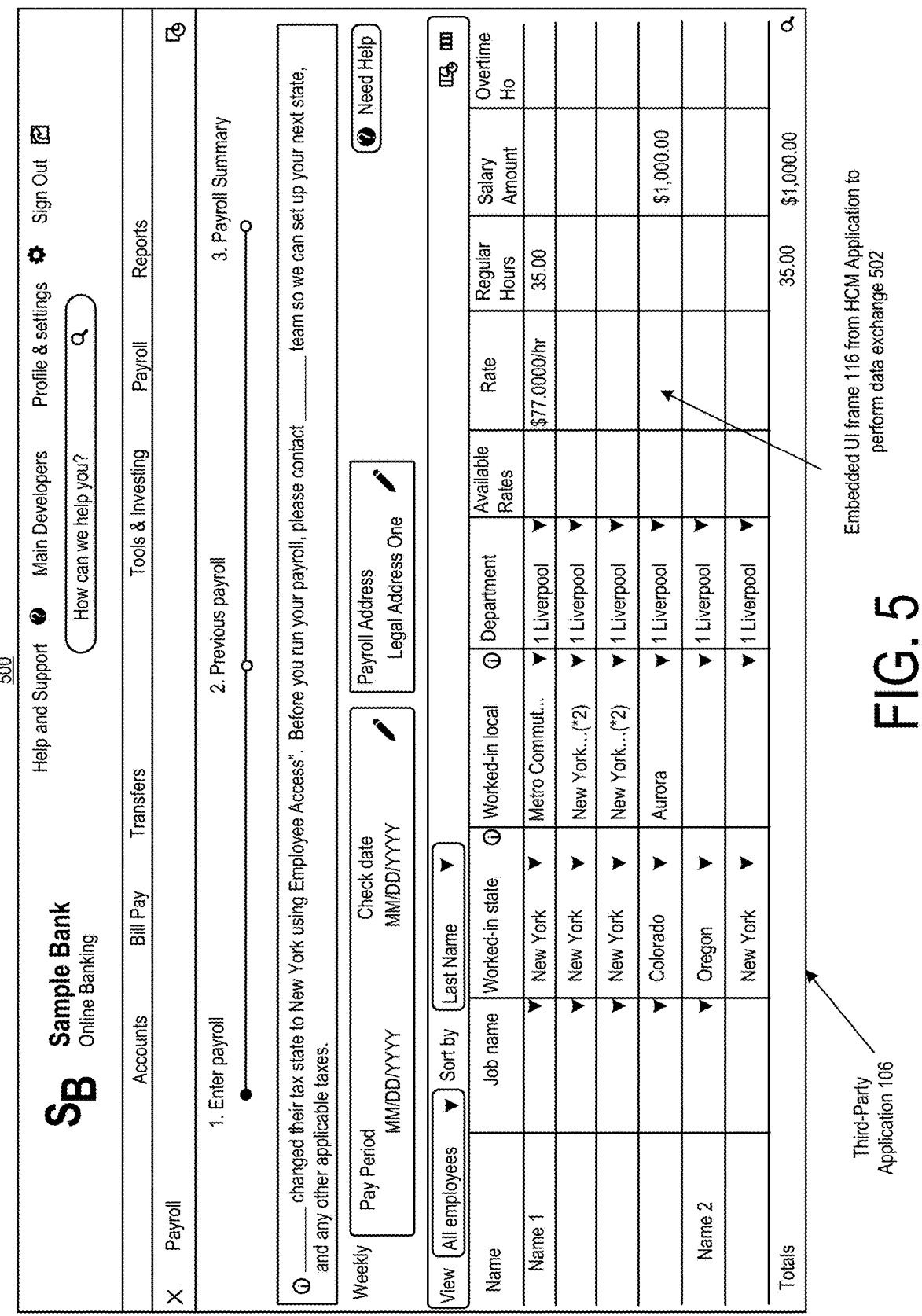
FIG. 5 is an illustrative example of a graphical user interface for a third-party application for use with an embedded resource management platform.

FIG. 5 is an illustrative example of a graphical user interface for a third-party application for use with an embedded resource management platform. The GUI 500 can be provided by one or more processors. The GUI 500 can be provided by one or more system or component depicted in FIG. 1, FIG. 7, FIG. 8, FIG. 9, or FIG. 10. The GUI 500 can be for a third-party application 106. The embedded RM application 110 can be provided as an embedded UI frame 502 from the RM application to perform data exchange using a secure communication channel or session in accordance with the RM server security policy.

Figure 6:
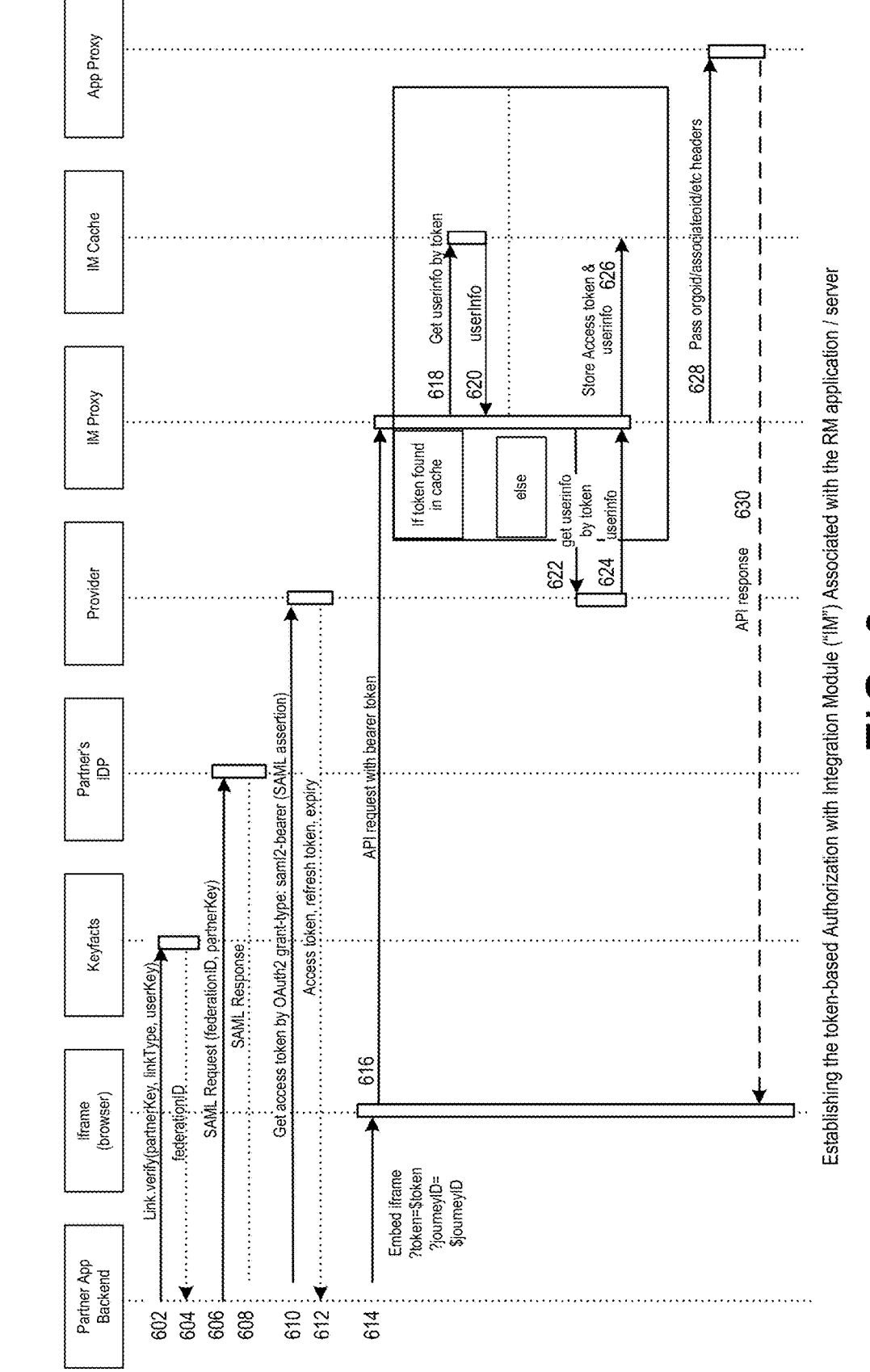
FIG. 6 is an illustrative example of a flow diagram for an embedded resource management platform.

FIG. 6 is an illustrative example of a flow diagram for an embedded resource management platform. The method 600 can be performed by one or more processors. The method 600 can be performed by one or more system or component depicted in FIG. 1, FIG. 7, FIG. 8, FIG. 9, or FIG. 10. The method 600 can include acts 602-628 that can be used to establish a token-based authorization with an integration module associated with the RM application or server.

Acts 602-630 can provide authentication and authorization process for integrating an embedded resource management (RM) application within a third-party platform. The sequence can start with the partner application initiating a verification request to ensure proper authentication through a series of identity checks and token exchanges. The method 600 can include obtaining a security assertion markup language (SAML) response from an identity provider, exchanging this for OAuth 2.0 (OAuth2) tokens from an OpenID Connect (OIDC) provider, and embedding the RM application within an iframe on the partner's platform. The process can include secure data handling, such as token validation and user information retrieval, to verify that only authorized users can access the embedded RM services.

At 602, the method 600 can include the partner application backend (e.g., the third-party application 106 depicted in FIG. 1) providing a link and receiving a federation identifier ("ID"). For instance, the Partner App Backend (e.g., server component handling authentication and authorization for a partner application) can initiate the authentication process by sending a verification request to Keyfacts (e.g., an intermediary service for validating requests) using the function link.verify(partnerKey, linkType, userKey). This request can include parameters such as partnerKey (an identifier for the partner application), linkType (the type of link or connection being verified), and userKey (a unique identifier for the user).

At 604, the Keyfacts can respond to the verification request by returning a federationID to the Partner App Backend. The federationID can be an identifier that links the partner application with the identity provider (IDP) for further authentication and confirm that the initial verification was successful. It can also provide the identifier for the subsequent SAML (Security Assertion Markup Language) authentication process.

At 606, the method can include a security assertion markup language ("SAML") request with a federation ID and partner key being made from the partner application backend to the partner's identity provider. The partner can refer to the provider of the third-party service server 102 depicted in FIG. 1. The partner application backend gets a SAML response. This can initiate the SAML-based authentication process, where the federationID can be used to establish the identity of the partner application, and the partnerKey can identify the specific partner.

At 608, the Partner's IDP can process the SAML request and return a SAML Response to the Partner App Backend. This response can include the authentication details and assertions that confirm the partner application's identity and its authorization to access the requested resources.

At 610, the method 600 can include the partner app backend requesting an access token by an OAuth2 grant-type, and receiving the access token, refresh token, and an expiration term from the provider entity. For instance, the Partner App Backend can send a request to an OIDC provider to obtain an access token using the OAuth2 grant-type-saml2-bearer (SAML assertion). This request can include the SAML assertion received in the previous step. The response from the OIDC provider can include an access token, refresh token, and expiry details, which can be used to authenticate and authorize access to the resource management application.

At act 612, the OIDC provider can return the access token, refresh token, and expiry details to the Partner App Backend. The access token allows the partner application to make authenticated requests to the embedded RM application, while the refresh token can be used to obtain new access tokens when the current one expires. The expiry detail can specify the duration for which the access token is valid.

At act 614, the Partner App Backend can send an embed iframe request to the product iframe (browser), including the token and journeyID parameters. This request can embed the RM application within the partner application's iframe, using the provided token to authenticate and authorize access. The journeyID can specify the particular workflow or process to be displayed within the iframe, allowing for seamless integration of the RM application into the partner's platform.

At 616, the method 600 can include the embedded iframe making an API request with the bearer token. The bearer token included in the API request can be used to authenticate and authorize the request, ensuring that only valid and authorized interactions with the RM application are permitted.

At 618, the integration module ("IM") proxy server associated with the resource management application or server can check if the token is found in cache. At 620, if the token is found in cache, the IM proxy server can get the user info from the cache using the token and provide it to the IM proxy server. At 622, if the token is not found in the cache, the IM proxy server can request the user info using the token from the provider. At 624, the provider can provide the userinfo to the IM proxy. At 626, the IM Proxy can store the information in the IM cache.

At 628, the IM proxy server can then pass an object identifier or other head information to the application proxy. At 630, the App Proxy can provide an API response back to the product iframe (e.g., embedded UI frame 404) in the web browser. This response can provide the data or confirmation of the requested action, completing the interaction between the embedded RM application and the third-party application.

Figure 7:
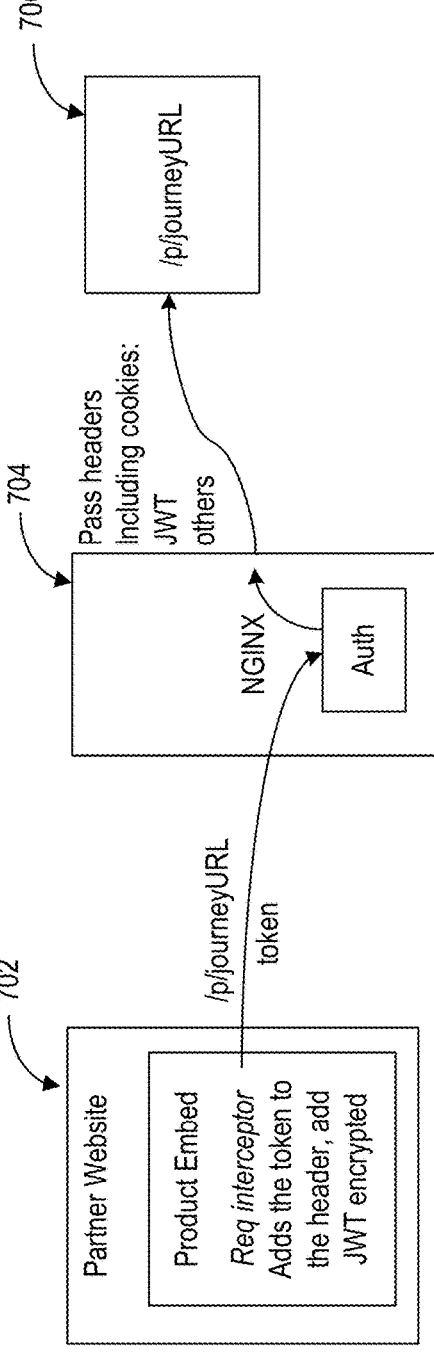
FIG. 7 is an illustrative example of an operation of a system of an embedded resource management platform.

FIG. 7 is an illustrative example of an operation of a system 700 of an embedded resource management platform. The system 700 can include or be implemented using one or more processors. In example system 700, a process of embedding a partner website with secure token management can be done through authentication layers. The first block 702 can represent a partner's site where the request interceptor can add a token to the header and encrypt it using JWT (JSON Web Token) for security. An arrow from the first block 702 shows that the token is sent to the next (e.g., middle) component block 704 which can serve an authentication gateway. This second block 704 can process the request, passing the necessary headers, including cookies and the JWT token. A second arrow leading to the third block 706 can indicate passing of the headers, including cookies to the final block 706 in which the user can be directed to the destination within the partner's journey URL, with authentication and security checks ensured throughout. The system 700 can include one or more system or component depicted in FIG. 1, FIG. 8, FIG. 9, or FIG. 10. The partner website can include or provide the product embedded iframe. The product embed can request an interceptor and add a token to the header and add a JSON web token ("JWT"). JSON can be a language-independent data format derived from JavaScript.

Figure 8:
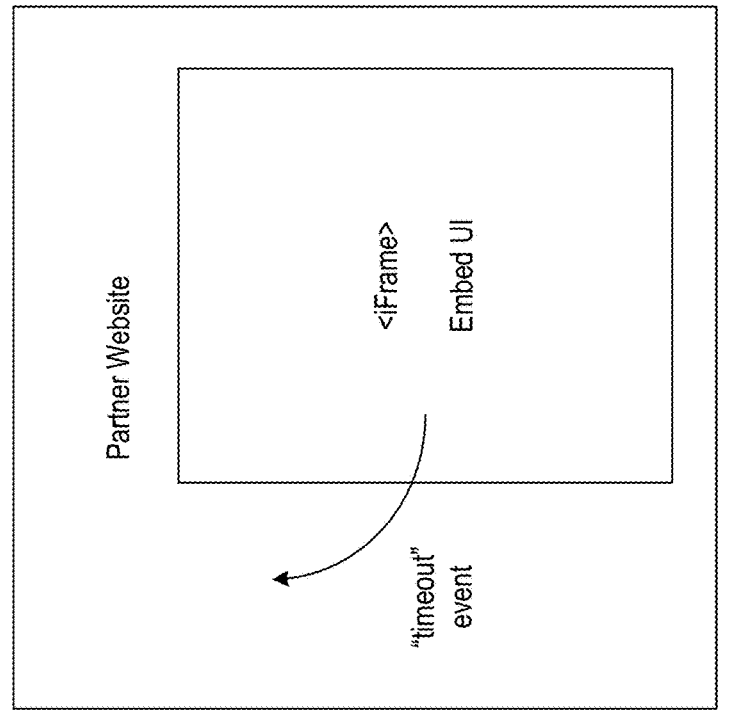
FIG. 8 is an illustrative example of a timeout event associated with an embedded resource management platform.

FIG. 8 is an illustrative example of a timeout event associated with an embedded resource management platform. The system 800 can include one or more processors. The system 800 can include one or more system or component depicted in FIG. 1, FIG. 7, FIG. 9, or FIG. 10. The system 800 can include or provide a partner website with an iframe (e.g., embedded UI frame 110), which can trigger a timeout event on the partner website.

Figure 9:
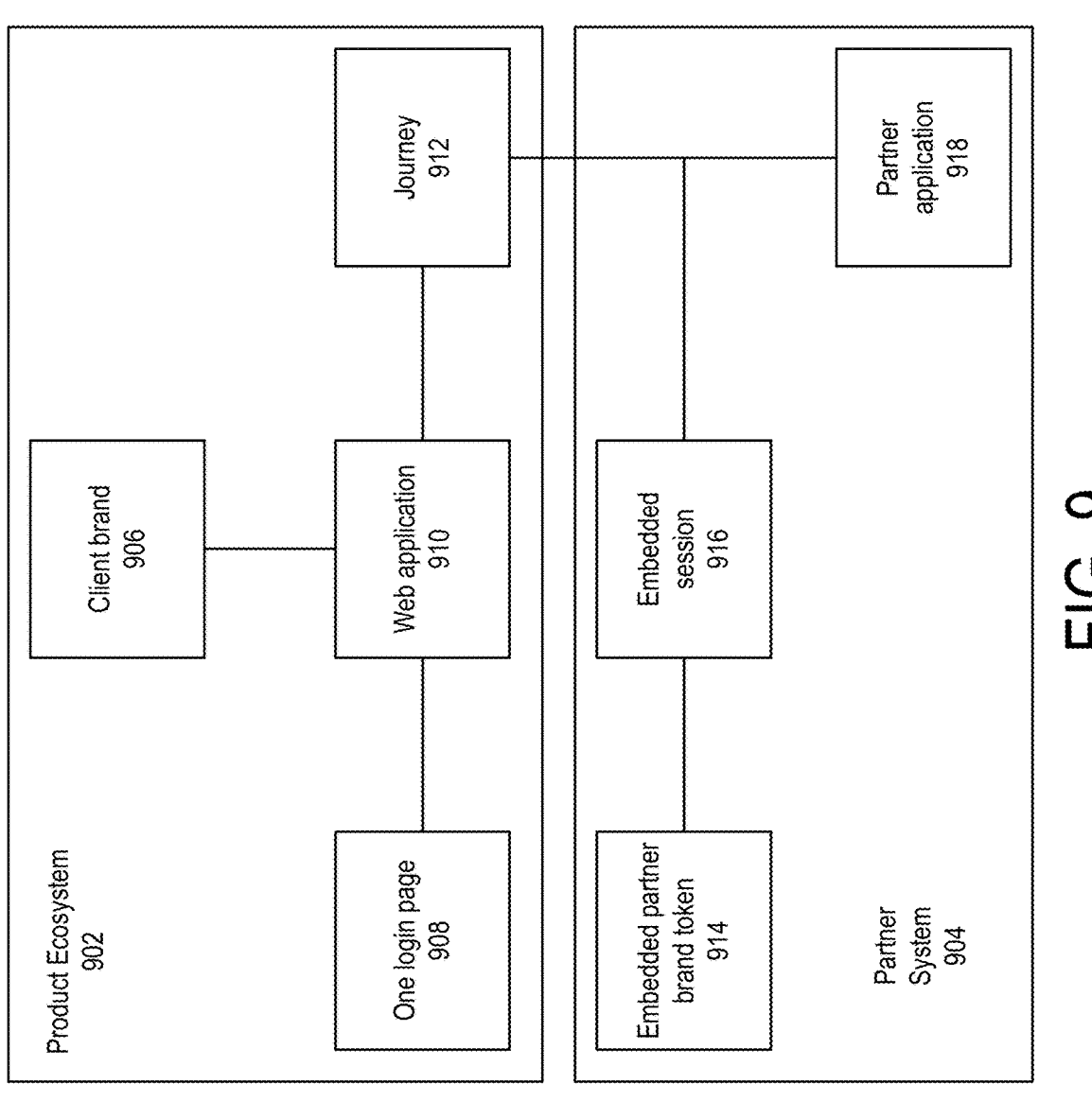
FIG. 9 is an illustrative example of an operation of a system of an embedded resource management platform.

FIG. 9 is an illustrative example of an operation of a system of an embedded resource management platform. The system 900 can include one or more processors. The system 900 can include one or more system or component depicted in FIG. 1, FIG. 7, FIG. 8, or FIG. 10. The system 900 can include or interface with a product ecosystem 902 or a partner system 904. The product ecosystem 902 can provide the client brand 906, a login page 908, a product web application 910, and a product journey 912. The partner system 904 can provide the partner application 918, which can receive information or interface with the product journey 912. The partner system 904 can embed the partner brand token 914 and an embedded session 916.

FIG. 10 illustrates a block diagram of a computing system 1000 for implementing the embodiments of the technical solutions discussed herein, in accordance with various aspects. FIG. 10 illustrates a block diagram of an example computing system 1000, which can also be referred to as the computer system 1000. Computing system 1000 can be used to implement elements of the systems and methods described and illustrated herein. Computing system 1000 can be included in and run on any device (e.g., a server, a computer, a cloud computing environment or a data processing system).

Computing system 1000 can include at least one bus data bus 1005 or other communication device, structure or component for communicating information or data. Computing system 1000 can include at least one processor 1010 or processing circuit coupled to the data bus 1005 for executing instructions or processing data or information. Computing system 1000 can include one or more processors 1010 or processing circuits coupled to the data bus 1005 for exchanging or processing data or information along with other computing systems 1000. Computing system 1000 can include one or more main memories 1015, such as a random access memory (RAM), dynamic RAM (DRAM), cache memory or other dynamic storage device, which can be coupled to the data bus 1005 for storing information, data and instructions to be executed by the processor(s) 1010. Main memory 1015 can be used for storing information (e.g., data, computer code, commands or instructions) during execution of instructions by the processor(s) 1010.

Computing system 1000 can include one or more read only memories (ROMs) 1020 or other static storage device 1025 coupled to the bus 1005 for storing static information and instructions for the processor(s) 1010. Storage devices 1025 can include any storage device, such as a solid state device, magnetic disk or optical disk, which can be coupled to the data bus 1005 to persistently store information and instructions.

Computing system 1000 may be coupled via the data bus 1005 to one or more output devices 1035, such as speakers or displays (e.g., liquid crystal display or active matrix display) for displaying or providing information to a user. Input devices 1030, such as keyboards, touch screens or voice interfaces, can be coupled to the data bus 1005 for communicating information and commands to the processor(s) 1010. Input device 1030 can include, for example, a touch screen display (e.g., output device 1035). Input device 1030 can include a cursor control, such as a mouse, a trackball, or cursor direction keys, for communicating direction information and command selections to the processor(s) 1010 for controlling cursor movement on a display.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors 1010 in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Figure 11:
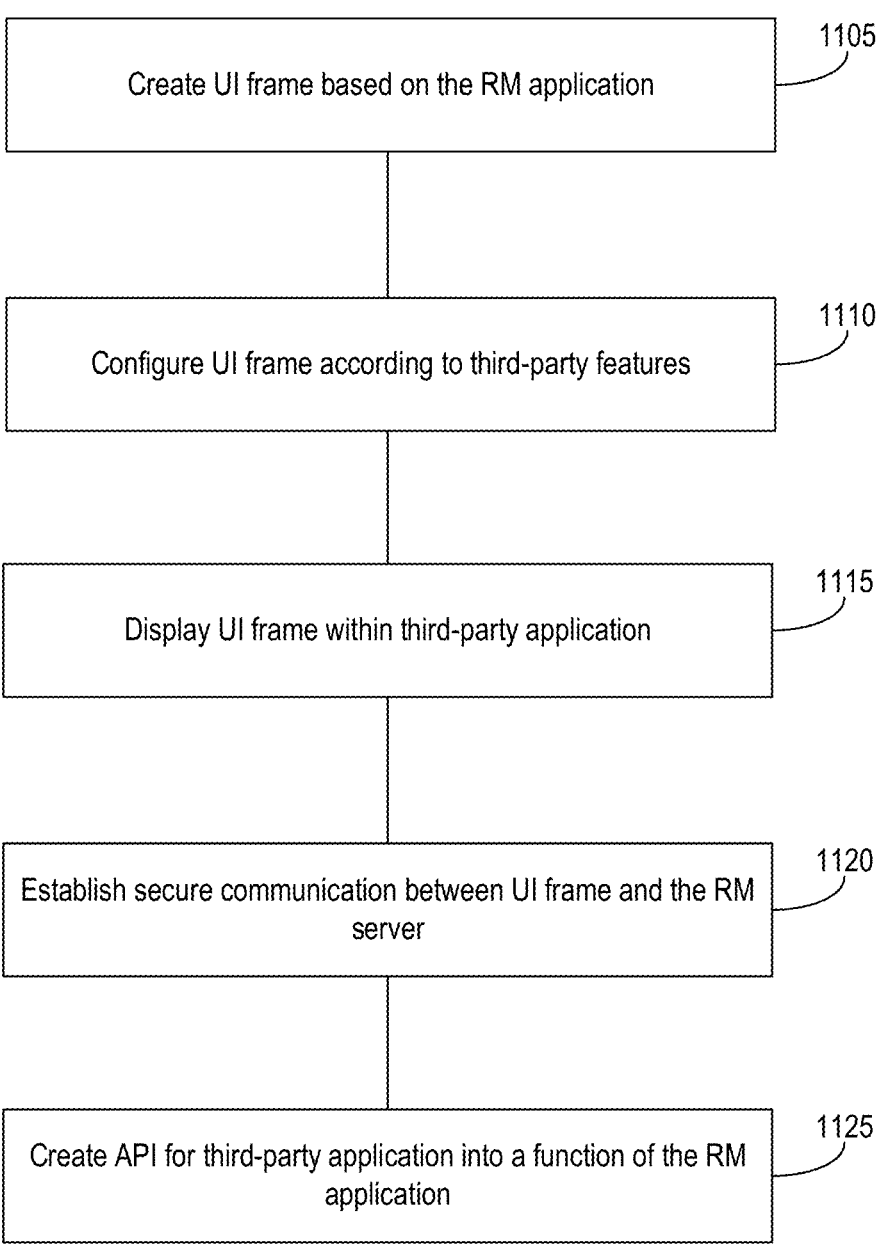
FIG. 11 illustrates an example of a flow diagram of a method for providing an embedded resource management platform via a user interface frame.

FIG. 11 illustrates a flow diagram of a method 1100 for providing an embedded resource management platform within a user interface frame. The method 1100 can be performed by one or more systems, features, techniques or components depicted in FIGS. 1-10, including, for example, a system 100 implemented in a computing system 1000 of FIG. 10. The functionalities of the third-party service server 102, remote RM server 104 and the client device 112, and any of their components, can be implemented using one or more processors 1010 that can be coupled with one or more memories 1015.

The method 1100 can include acts 1105-1125. At 1105, the method can create user interface (UI) frame based on the resource management (RM) application. At 1110, the method can configure UI frame according to third-party features. At 1115, the method can display UI frame within a third-party application. At 1120, the method can establish secure communication between the UI frame and the RM server. At 1125, the method can create one or more APIs for third-party application into a function of the RM application.

At 1105, the method can include crating a user interface (UI) frame based on the resource management (RM) application. The one or more processors coupled with memory can be configured (e.g., via instructions and data stored in the memory) to create a UI frame based on a resource management application provided by a resource management server. The resource management server can be configured to provide one or more human capital management (HCM) operations or functionalities. The resource management server can be provided via a physical server, a virtual server or via a cloud-based service. The functionalities or operations of the resource management server can include at least one of: processing of payroll, taxes, or employee benefits. The resource management server can be in communication with a third-party application of a third-party service server. The third-party application can be an application capable of accessing the remote resource management application via application programming interfaces (APIs) to perform at least one of: processing of payroll, filing taxes, managing employee benefits, tracking of employee time, onboarding of an employee and employee performance reviews.

The UI frame can include a user interface component, such as a container for embedding external content or applications (e.g., RM application) within a host application (e.g., a third-party application). The UI frame can include visual layout and interactive elements allowing users to engage with the embedded application (e.g., embedded RM application) within the UI frame inserted within the third-party application. The UI frame can allow the user of a client device to engage with various features (e.g., third-party features, such as menus, buttons, forms, logos or interactive functions) configured as features of the third-party application but interactive with the embedded RM application. The resource management application can include one or more functions, such as a function to manage user access within the third-party application. The management of the user access within the third-party application can be based on the token. The RM application can include a function to retrieve data of the resource management application based on the token, or a function to execute a process within the user interface frame based on the token.

The embedded resource management application can be configured to provide an operation, including any HCM operation. For instance, the embedded RM application can include any one or more of operations for: payroll processing, tax processing, human resources processing or recruitment service. The embedded resource management application can include the functionalities or operations for secure access to employee data, including pay history, W-2 forms, 1099 forms, payment or resource transactions and benefits summaries through the UI frame within the third-party application.

At 1110, the method can configure UI frame according to third-party features. The one or more processors can be configured (e.g., via instructions or data stored in the memory) to determine one or more features of a third-party application. The one or more processors can configure the user interface frame of the resource management application according to the one or more features of the third-party application. For instance, the one or more features of the third-party application can include any one or more of: a logo or a slogan of the third-party application, a color scheme of the third-party application, a menu configuration of the third-party application, size and shape of features (e.g., tables, lines or shapes) of the third-party application, placement and configuration of buttons, menus or frames of the user interface as in the third-party application, fonts and sizing of the letters of the third-party application or any data or information on the third-party application.

The third-party application can include at least one of: an application for providing a point-of-sale transaction, an application for managing an operation of a business (e.g., a restaurant), or an operation for managing transactions of a bank. The third-party application can include an application for customer relationship management, an e-commerce platform, a banking or a financial services application, an inventory management system, a healthcare management system, an education or training management system, a manufacturing or a plant operations application or a workforce management platform.

The method can include the one or more processors identifying third-party application features, such as the theme of the third-party application. The theme can include at least one of: a color scheme of the third-party application, a font of a letter of the third-party application, or a layout of the third-party application. The one or more processors can configure the user interface frame according to the theme.

The method can include the one or more processors configured to store, with the resource management server, a setting for the user interface frame. The setting can be configured for updates to the user interface frame based on a change to the resource management application on the resource management server.

At 1115, the method can display UI frame within a third-party application. For instance, the one or more processors can provide the configured user interface frame for display within the third-party application. For instance, the one or more processors of a client device can implement a user interface of the client device. The user interface can access and display one or more windows or frames of the third-party application. The third-party application can include or display a UI frame within the third-party application within which the RM application can be embedded. The embedded RM application can be configured, arranged or reshaped such that it conforms to or implements the third-party features (e.g., the logo, the color scheme, the theme, the fonts, the layout or the menu styles of the third-party application). The embedded RM application can be displayed seamlessly within the third-party application allowing the user to utilize the features and functionalities (e.g., HCM functionalities or operations of the remote RM application) within the window or user interface that appears, resembles and is configured as the third-party application.

For instance, the UI frame can include an iframe of a third-party application implemented in a web browser. The iframe can include the embedded RM application within a web-based third-party application displayed within a user interface of a client device accessing the third-party application via a network.

At 1120, the method can establish secure communication between the UI frame and the RM server. The one or more processors can be configured to establish a secure communication channel for data exchange between the configured user interface frame and the resource management server in accordance with a security policy of the resource management server. For example, a secure communication channel can be established between the UI frame of the user interface of the client device and the remote RM server or the third-party service server. The secure communication channel can be established between the third-party service server and the remote RM server using a network comprising at least one of a Local Area Network (LAN), Wide Area Network (WAN), Metropolitan Area Network (MAN), or Virtual Private Network (VPN).

The one or more processors can be configured to generate a token to establish the secure communication channel between the configured user interface frame and the resource management server. The one or more processors can authenticate the third-party application using the token. The one or more processors can encrypt data transmitted via the secure communication channel using the token. The one or more processors can identify a token for a request of the application programming interface and embed the token into a header of the application programming interface for communication via the secure communication channel. The token can be configured to validate the request of the application programming interface by the third-party application and authorize access of the third-party application to the resource management application.

The one or more processors can be configured to identify the security policy defining a token for authentication of the application programming interface associated with the user interface frame. The one or more processors can verify that the token is embedded in a request for the application programming interface per the security policy prior to making the call into the function of the resource management application.

The one or more processors can be configured to receive, from the resource management server, a notification of an upcoming session timeout for the third-party application. For instance, the notification can include an information indicating a timing at which the session or the token is going to expire. The notification can trigger creation of a new token to refresh or continue the secured communication. The one or more processors can include sending, to the resource management server, a request for a secure URL for re-embedding the user interface frame within the third-party application, prior to the session timeout. The secure communication channel can utilize a cross-origin resource sharing (CORS) configuration to allow secure data exchange between a first domain of the third-party application and a second domain of the resource management application.

At 1125, the method can create one or more APIs for third-party application into a function of the RM application. The one or more processors can include creating, for embedding with the third-party application, an application programming interface (API) for the third-party application. The API can be configured to call into a function of the resource management application via the secure communication channel. The API can be configured to call, trigger or initiate any of the operations or functions of the embedded RM application that are not included or configured within the third-party application. For example, the API can be configured to call or trigger an operation or a process for processing of payroll, an operation or process for processing of taxes (e.g., employee income taxes or corporation taxes), an operation or process for processing of employee benefits, or a process or operation for performing a financial transaction. The APIs can be configured to trigger operation or process corresponding to any one or more of: benefits administration processing, employee time tracking, recruitment and onboarding, employee performance management, leave and absence management, compliance reporting, retirement or benefits programs or any other HCM operation.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

What is claimed is:
1. A system, comprising:
one or more processors, coupled with memory, to:
create a user interface frame based on a resource management application provided by a resource management server;

determine one or more features of a third-party application;
configure the user interface frame of the resource management application according to the one or more features of the third-party application;
provide the configured user interface frame for display within the third-party application;
generate a token to establish a secure communication channel between the configured user interface frame and the resource management server;
establish the secure communication channel for data exchange between the configured user interface frame and the resource management server in accordance with a security policy of the resource management server;
authenticate the third-party application using the token;
encrypt data transmitted via the secure communication channel using the token; and
create, for embedding with the third-party application, an application programming interface for the third-party application that is configured to call into a function of the resource management application via the secure communication channel.

2. The system of claim 1, comprising the one or more processors to:
identify a token for a request of the application programming interface; and
embed the token into a header of the application programming interface for communication via the secure communication channel.

3. The system of claim 2, wherein the token is configured to validate the request of the application programming interface by the third-party application and authorize access of the third-party application to the resource management application.

4. The system of claim 1, comprising the one or more processors to:
identify a theme of the third-party application, the theme including at least one of: a color scheme of the third-party application, a font of a letter of the third-party application, or a layout of the third-party application; and
configure the user interface frame according to the theme.

5. The system of claim 1, comprising the one or more processors to store, with the resource management server, a setting for the user interface frame, the setting configured for updates to the user interface frame based on a change to the resource management application on the resource management server.

6. The system of claim 1, comprising the one or more processors to:
identify the security policy defining a token for authentication of the application programming interface associated with the user interface frame; and
verify that the token is embedded in a request for the application programming interface per the security policy prior to making the call into the function of the resource management application.

7. The system of claim 6, wherein the function of the resource management application includes at least one of: a function to manage user access within the third-party application based on the token, a function to retrieve data of the resource management application based on the token, or a function to execute a process within the user interface frame based on the token.

8. The system of claim 1, wherein the third-party application includes at least one of: an application for providing a point-of-sale transaction, an application for managing an operation of a business, or an operation for managing transactions of a bank.

9. The system of claim 1, wherein the secure communication channel between a third-party service server and the resource management server is established using a network comprising at least one of a Local Area Network (LAN), Wide Area Network (WAN), Metropolitan Area Network (MAN), or Virtual Private Network (VPN).

10. The system of claim 1, wherein the embedded resource management application is configured to provide an operation including at least one of: payroll processing, tax processing, human resources processing or recruitment service.

11. The system of claim 1, wherein the embedded resource management application supports secure access to employee data, including pay history, W-2 forms, 1099 forms, and benefits summaries through the third-party application.

12. The system of claim 1, wherein the resource management server is configured to provide, via a cloud-based service, at least one of: processing of payroll, taxes, or employee benefits, and wherein the third-party application is capable of accessing the resource management server via application programming interfaces (APIs) to perform at least one of: processing of payroll, filing taxes, managing employee benefits, tracking of employee time, onboarding of an employee and employee performance reviews.

13. The system of claim 1, wherein the one or more features of the third-party application include a logo of the third-party application, a color scheme of the third-party application and information on the third-party application.

14. The system of claim 1, wherein the user interface frame comprises an iframe of the third-party application implemented in a web browser and the secure communication channel utilizes a cross-origin resource sharing (CORS) configuration to allow secure data exchange between a first domain of the third-party application and a second domain of the resource management application.

15. The system of claim 1, comprising the one or more processors to:

receive, from the resource management server, a notification of an upcoming session timeout for the third-party application; and sending, to the resource management server, a request for a secure URL for re-embedding the user interface frame within the third-party application, prior to the session timeout.

16. A method, comprising:

creating, by one or more processors coupled with memory, a user interface frame based on a resource management application provided by a resource management server;

determining, by the one or more processors, one or more features of a third-party application;

configuring, by the one or more processors, the user interface frame of the resource management application according to the one or more features of the third-party application;

providing, by the one or more processors, the configured user interface frame for display within the third-party application;

generating, by the one or more processors, a token to establish a secure communication channel between the configured user interface frame and the resource management server;

establishing, by the one or more processors, the secure communication channel for data exchange between the configured user interface frame and the resource management server in accordance with a security policy of the resource management server;

authenticating, by the one or more processors, the third-party application using the token;

encrypting, by the one or more processors, data transmitted via the secure communication channel using the token; and creating, by the one or more processors for embedding with the third-party application, an application programming interface for the third-party application that is configured to call into a function of the resource management application via the secure communication channel.

17. The method of claim 16, comprising:

identifying, by the one or more processors, a token for a request of the application programming interface; and embedding, by the one or more processors, the token into a header of the application programming interface for communication via the secure communication channel.

18. A non-transitory computer readable medium storing program instructions for causing at least one processor to:

create a user interface frame based on a resource management application provided by a resource management server;

determine one or more features of a third-party application;

configure the user interface frame of the resource management application according to the one or more features of the third-party application;

provide the configured user interface frame for display within the third-party application;

generate a token to establish a secure communication channel between the configured user interface frame and the resource management server;

establish the secure communication channel for data exchange between the configured user interface frame and the resource management server in accordance with a security policy of the resource management server;

authenticate the third-party application using the token;

encrypt data transmitted via the secure communication channel using the token; and create, for embedding with the third-party application, an application programming interface for the third-party application that is configured to call into a function of the resource management application via the secure communication channel.

* * * * *